United States Patent
Norton

(10) Patent No.: US 7,464,428 B2
(45) Date of Patent: Dec. 16, 2008

(54) SOLE ELEMENTS OF VARYING DENSITY AND METHODS OF MANUFACTURE

(75) Inventor: Daniel Eugene Norton, El Paso, TX (US)

(73) Assignee: adidas International Marketing B.V., Amsterdam (NL)

( * ) Notice: Subject to any disclaimer, the term of this patent is extended or adjusted under 35 U.S.C. 154(b) by 305 days.

(21) Appl. No.: 10/978,828

(22) Filed: Nov. 1, 2004

(65) Prior Publication Data

US 2005/0166423 A1    Aug. 4, 2005

(30) Foreign Application Priority Data

Nov. 11, 2003    (DE) ............... 103 52 658

(51) Int. Cl.
  *A43D 25/00*    (2006.01)
(52) U.S. Cl. ............... 12/146 B; 12/146 BR; 12/142 R; 36/142
(58) Field of Classification Search ............ 012/146 R, 012/146 B, 146 BR, 142 R; 36/43, 44, 142, 36/143, 144, 25 R, 30 R, 31
See application file for complete search history.

(56) References Cited

U.S. PATENT DOCUMENTS

| | | | |
|---|---|---|---|
| 2,099,418 A | | 11/1937 | Bradley et al. |
| 2,917,842 A | * | 12/1959 | Scholl ................... 36/178 |
| 3,418,732 A | * | 12/1968 | Marshack ............... 36/44 |
| 3,576,911 A | | 4/1971 | Maxey |
| 3,591,882 A | * | 7/1971 | Pearsall ................ 12/146 B |
| 3,738,373 A | * | 6/1973 | Glancy ................... 36/144 |
| 3,766,669 A | * | 10/1973 | Pearsall ................. 36/43 |
| 4,076,876 A | * | 2/1978 | Bowles .................. 428/71 |
| 4,216,131 A | | 8/1980 | Himes et al. |
| 4,316,335 A | | 2/1982 | Giese et al. |
| 4,372,059 A | | 2/1983 | Ambrose |
| 4,378,642 A | | 4/1983 | Light et al. |
| 4,418,483 A | | 12/1983 | Fujita et al. |
| 4,476,180 A | | 10/1984 | Wnuk |
| 4,615,126 A | * | 10/1986 | Mathews ................ 36/102 |
| 4,640,797 A | | 2/1987 | Goguen |
| 4,642,911 A | | 2/1987 | Talarico, II |
| 4,694,589 A | * | 9/1987 | Sullivan et al. ........... 36/44 |
| 4,747,989 A | * | 5/1988 | Peterson ................ 264/223 |
| 4,779,359 A | | 10/1988 | Famolare, Jr. |
| 4,823,483 A | * | 4/1989 | Chapnick ................ 36/43 |
| 4,864,739 A | | 9/1989 | Maestri |
| 4,910,886 A | * | 3/1990 | Sullivan et al. ........... 36/44 |
| 4,936,030 A | | 6/1990 | Rennex |

(Continued)

FOREIGN PATENT DOCUMENTS

EP    1281506    2/2003

(Continued)

*Primary Examiner*—Marie Patterson
(74) *Attorney, Agent, or Firm*—Goodwin Procter LLP

(57) ABSTRACT

The invention relates to sole elements and methods for manufacturing sole elements for shoes, in particular for sport shoes, with a specific density distribution in a transverse and/or longitudinal direction. The methods include the steps of manufacturing a sole element preform from a polymer material with a thickness varying in the transverse and/or longitudinal direction depending on the desired density distribution and the press-forming of the sole element preform in a forming tool to form the finished sole element from the sole element preform.

27 Claims, 10 Drawing Sheets

U.S. PATENT DOCUMENTS

| | | | |
|---|---|---|---|
| 5,025,573 A | | 6/1991 | Giese et al. |
| 5,154,682 A | * | 10/1992 | Kellerman .................... 36/44 |
| 5,282,328 A | * | 2/1994 | Peterson .................... 36/154 |
| 5,551,173 A | * | 9/1996 | Chambers .................... 36/44 |
| 5,687,441 A | * | 11/1997 | Rachman et al. .......... 12/142 R |
| 5,695,850 A | | 12/1997 | Crow |
| 5,709,954 A | | 1/1998 | Lyden et al. |
| 5,786,057 A | | 7/1998 | Lyden et al. |
| 5,885,500 A | * | 3/1999 | Tawney et al. .............. 264/154 |
| 6,092,314 A | * | 7/2000 | Rothbart .................... 36/144 |
| 6,360,453 B1 | | 3/2002 | Ellis, III |
| 6,528,140 B1 | | 3/2003 | Kalin et al. |
| 6,725,578 B2 | * | 4/2004 | Kerrigan .................... 36/144 |
| 7,100,308 B2 | * | 9/2006 | Aveni .......................... 36/27 |
| 2002/0139011 A1 | * | 10/2002 | Kerrigan .................... 36/144 |

FOREIGN PATENT DOCUMENTS

| | | |
|---|---|---|
| JP | 9-23904 | 1/1997 |
| WO | WO 95/03719 | 2/1995 |

* cited by examiner

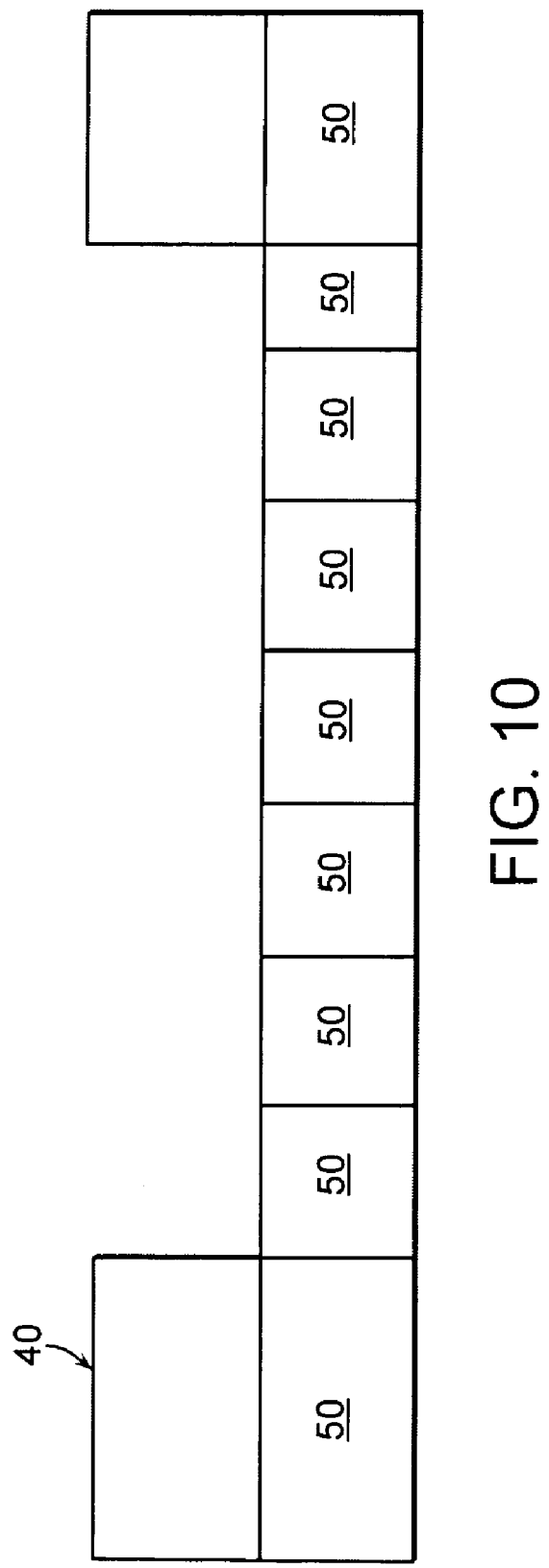

SOLE ELEMENTS OF VARYING DENSITY AND METHODS OF MANUFACTURE

CROSS-REFERENCE TO RELATED APPLICATION

This application claims priority to and the benefit of, German patent application serial number 10352658.7, filed on Nov. 11, 2003, the entire disclosure of which is hereby incorporated herein by reference.

TECHNICAL FIELD

The present invention relates to sole elements for shoes and other articles of footwear and methods for their manufacture. The present invention relates in particular to sole elements for shoes having a specific density distribution in a transverse and/or longitudinal direction.

BACKGROUND OF THE INVENTION

It is generally known that injuries may arise if the moving parts of the body are subjected to high stress during walking or running. Such injuries arise in particular with sports requiring a great amount of movement. This applies for both contact sports, for example soccer, and non-contact sports, for example running or jogging.

In particular, long distance runners are often concerned with injuries or stress on the moving parts of the body, which may reduce performance and may lead to the inability to further perform this sport. The most serious of these injuries are injuries to the knee or injuries to the cartilage. Such injuries arise often due to the turning movement that accompanies the gait cycle when the foot contacts the ground and pushes off from the ground. Two types of turning movements that are considered as being dangerous are pronation and supination. Both lead often to injuries of the knee. Pronation is a rotation or turning of the foot from a lateral side, i.e., the outer side, of the foot to a medial side, i.e., the inner side, of the foot. During the gait cycle, the foot typically contacts the ground at first with the outer part of the heel. The weight is then shifted to the forefoot part to start the pushing-off phase. During this pushing-off phase, the pronation turning to the medial side of the foot starts. Supination is a corresponding turning of the foot from the medial side to the lateral side of the foot. Both often lead to injuries of the knee.

To address the above-mentioned problems, several approaches have been suggested in the prior art. For example, U.S. Pat. No. 4,615,126, the disclosure of which is hereby incorporated herein by reference in its entirety, describes a sole unit, in particular for sports shoes, with segments in the forefoot part at the third to fifth metatarsal-phalangeal joints of the foot with an increased flexibility in comparison to the remaining part of the sole unit. Such a configuration may reduce the resistance of the sole unit with respect to the bending of the foot along the third to fifth metatarsal-phalangeal joints, whereby tensions in the respective muscles are reduced and a pushing-off movement in particular by the first and second metatarsal-phalangeal joints of the foot is achieved. The provision of the more flexible part in the forefoot part may lead to a reduction of the pronation or supination movement.

Another known solution, as shown for example in U.S. Pat. No. 5,025,573, the disclosure of which is hereby incorporated herein by reference in its entirety, relates to a sole unit with different parts made out of substances with different elastic properties. The described sole unit consists of two layers, i.e., a lower layer of a firm material (which may also serve as the outsole) and an upper softer layer. The lower layer has an increased thickness in the heel part and in the part of the arch that serves as an upper stabilizing surface for the foot. The superposed softer damping layer is formed complementary to the lower firmer layer and to the foot, where its thickness varies in dependence of the transverse position.

Yet another known solution is, for example, described in International Patent Application No. WO95/03719 filed under the PCT, the disclosure of which is hereby incorporated herein by reference in its entirety. According to this approach, pronation is counteracted by inserting into the heel part of the sole unit a wedge-like element being on its lower side in contact with the outsole. The wedge-like element comprises upper and lower layers of a composite material of carbon fibers with a springy core material in between. The wedge-like element tapers from the medial side to the lateral side and from the heel to the midfoot area. In other words, the wedge-like element tapers in two directions.

In addition, U.S. Pat. No. 4,642,911, the disclosure of which is hereby incorporated herein by reference in its entirety, discloses a sole construction that is to be further described with reference to FIG. 12 of the present application. In particular, the '911 patent discloses a sole unit that is suggested to control pronation consisting of a material with a dual density. To this end, the sole unit is made out of two different materials A and B, where material A has a higher density compared to that of material B. FIG. 12 depicts in cross-section such a sole unit, including two wedge-like elements 150, 155 that may be glued or melted to each other. The '911 patent describes that the formation of the wedge-like element 150 as a material of higher density causes a continuous decrease of the density of the sole unit from the medial side to the lateral side, and that thereby a support of the medial side of the foot is achieved. The '911 patent describes further that for a control of supination movement the wedge 150 with the material of higher density may be arranged on the lateral side of the sole unit.

In the following, a manufacturing method for sole units according to the prior art is discussed, consisting of parts with different density. Reference is made thereto to FIGS. 11A-11C of the present application. As shown in FIG. 11A, a tool 100 is filled with a polymer material 120 to be formed having a certain first density. The block of material 120 may include in a desired part a second material of higher density 125. In FIG. 11A, this second material 125 is shown as being embedded into the first material 120. Alternatively, it is also possible to position two different blocks 120, 125 separately into the tool. Finally, the tool 100 is closed by positioning a second half of the tool 100' onto the first half of the tool (FIG. 11B).

Subsequently, the sole unit is formed into its desired shape (FIG. 11C) according to the tool from the material blocks 120, 125 (i.e., preforms) by the application of pressure and heat. The above mentioned techniques, however, have a severe disadvantage that for achieving the desired density variation over a transverse and/or longitudinal area of the sole unit, two different materials of different densities are at first formed and subsequently connected to each other. This requires not only increased labor consumption, but also leads to interconnection problems, since the two materials with different densities have to be compatible with each other. Furthermore, it has to be taken into account that shoes, in particular sport shoes, are mass-produced products that are produced by machines.

For at least these reasons, the complex forming of two materials to be interconnected for achieving a desired density variation is only possible with a high expenditure.

SUMMARY OF THE INVENTION

Thus, it is an object of the present invention to provide a sole unit for shoes, in particular for sport shoes, that can be produced in a simple and, therefore, convenient manner with respect to the production technology, and still allow a predetermined density variation in a transverse and/or longitudinal direction over a complete area of the sole element.

One aspect of one embodiment of the present invention is to not use two different materials with different densities to create the density variation over the sole element and to connect these materials subsequently, but to use a single material being supplied as a preform and having a thickness distribution that is transformed by pressure forming into the desired density distribution.

One advantage of this embodiment of the invention is that all subsequent problems of the interconnection of different sole elements are no longer present and the complete sole element is finished in a single production step. Since the resulting density variation is primarily correlated with the geometrical dimensions of the preform, any variation of the density and, therefore, of the elastic properties over the complete area of the sole unit can be achieved without the complementary formation of two material layers.

In one approach to an embodiment of the invention, a preform with a varying thickness in a transverse and/or longitudinal direction is not used for obtaining the density variation, but instead a homogeneous preform that is differently expanded in the forming tool by a selective supply of heat is used. The density distribution is, therefore, obtained by locally differently expanded parts of the polymer material.

In one aspect, an embodiment of the invention relates to a method of manufacturing a sole element for a shoe, where the sole element has a varying density distribution in at least one direction, for example a transverse and/or longitudinal direction. The method includes manufacturing a sole element preform from a polymer material with a thickness varying in the transverse and/or longitudinal direction depending on the specific density distribution desired and press-forming the sole element preform in a forming tool to form the finished sole element from the sole element preform. In one embodiment, the finished sole element has a substantially constant thickness in at least one transverse direction. Additionally, the sole element preform may be subjected to a non-uniform compression during the press-forming step.

In another aspect, an embodiment of the invention relates to a method of manufacturing a sole element for a shoe, where the sole element has a varying density distribution in at least one direction, for example a transverse and/or longitudinal direction. The method includes manufacturing a sole element preform from a polymer material and press-forming the sole element preform in a forming tool with a selective supply of heat to single sections of a surface of the tool to locally selectively expand the sole element preform to form the finished sole element with the desired density distribution from the sole element preform.

In another aspect, an embodiment of the invention relates to a sole element for a shoe. The sole element includes a homogeneous polymer material including a portion having a locally varying density. The homogeneous polymer material may include ethylene vinyl acetate. In addition, the sole element can include a border part having a homogeneous density disposed adjacent to the portion having a locally varying density.

In another aspect, an embodiment of the invention relates to a forming tool for the manufacture of a sole element for a shoe out of sole element preforms, wherein the forming tool includes heating elements that are locally associated to a forming surface of the tool for the selective supply of heat to single parts of the forming surface of the tool to expand selective parts of the sole element preform to form the sole element. The resulting sole element has a varying density distribution.

In various embodiments of the foregoing aspects, the method includes the step of supplying heat during the press-forming. Density can increase gradually from a lateral side of the sole element to a medial side of the sole element or density can decrease gradually from a lateral side of the sole element to a medial side of the sole element. Alternatively or additionally, density of the sole element can vary from a rear foot part of the sole element to a forefoot part of the sole element. In one embodiment, the step of manufacturing the sole element preform includes the step of manufacturing the preform with a thickness decreasing linearly or non-linearly from a medial side of the preform to a lateral side of the preform. Sole elements manufactured by such a method can be adapted to different sports and to the different anatomy of a respective wearer.

Furthermore, the step of manufacturing the sole element preform can include the step of manufacturing the preform with a first portion having a substantially constant thickness from a medial side of the preform, an intermediate portion with a linear decrease in thickness, and a second portion having a substantially constant thickness in a direction of a lateral side of the preform. In one embodiment, the step of manufacturing the sole element preform can include the step of providing a preform including a rim of substantially constant thickness.

Additionally, the step of manufacturing the sole element preform can include the steps of expanding a block, for example a quadrant-shaped block, of a polymer material and subsequently cutting the expanded block into pieces with the respective desired varying thickness, thereby obtaining the specific thickness distribution. The cut preforms with varying thickness can then be formed into the sole element. In one embodiment, the preform is not produced at first as a quadrant-shaped block, but directly with the corresponding thickness modulation. This can, for example, be achieved by producing the preform by injection molding. In one embodiment, the polymer material can be ethylene vinyl acetate.

In additional embodiments, the step of manufacturing the sole element preform can include injection molding of the preform. In one embodiment, the sole element has a homogeneous polymer material including a portion having a locally varying density. The homogeneous polymer material can include ethylene vinyl acetate. The sole element can include a border part having a homogeneous density disposed adjacent to the portion having a locally varying density. In one example, the sole unit has a border part with a substantially constant density in the lateral side part and the medial side part to provide additional support to the foot.

Additional embodiments include a sole element manufactured in accordance with the preceding methods and a sole for an article of footwear that includes a sole element manufactured in accordance with the preceding methods. In one embodiment, the invention relates to an article of footwear including an upper and a sole including a sole element manufactured in accordance with the preceding methods.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 10 is a schematic cross-sectional view of a tool in accordance with one embodiment of the invention for the manufacture of a sole element;

DETAILED DESCRIPTION

In the following description, various embodiments of the methods in accordance with the invention relate to a sole element. It should, however, be noted that a sole element in accordance with the invention is typically used as part of a sole ensemble. That is, the sole element in accordance with the invention is typically formed as a midsole, where an outsole and an insole for improving comfort are additionally provided. Furthermore, it is not necessary that the sole element extends in a longitudinal direction (i.e. from the heel to the forefoot part) over the complete sole. It is also possible that a sole element in accordance with the invention is only used in the heel and/or in parts of the forefoot.

Figure 1:
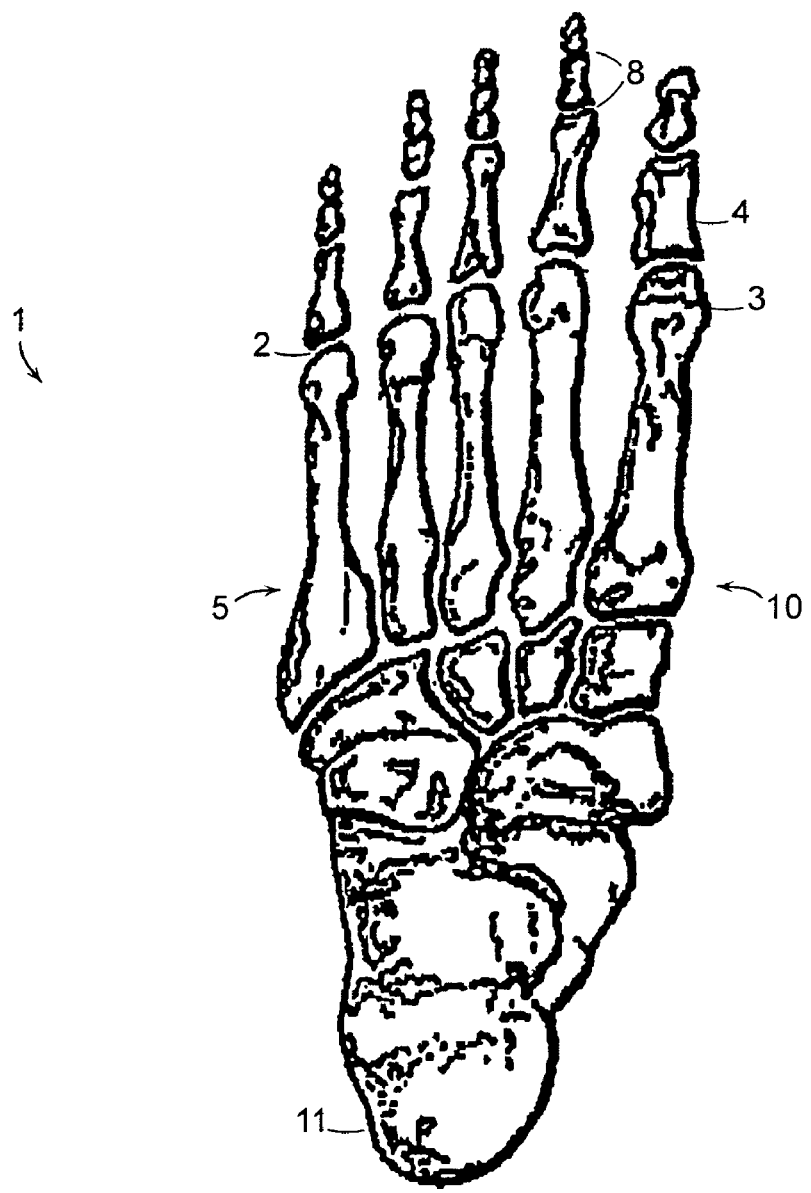
FIG. 1 is a schematic plan view of a skeleton of a human foot.

In the following, the human anatomy of the foot is discussed with reference to FIGS. 1, 2A, and 2B to clarify the function of a sole element in accordance with the invention for the control of pronation and supination. FIG. 1 is a top view of a left human foot 1. FIG. 1 shows the calcareous 11 and the subsequent metatarsals 3. In the direction of the forefoot part, they are followed by the phalanges 4, which are connected to the metatarsals 3 by the metatarsal-phalangeal joints 2. The bones of the toes are interconnected by interphalangeal joints 6. Further, the medial side 10 and the lateral side 5 of the foot are shown in FIGS. 2A and 2B.

Figure 2A:
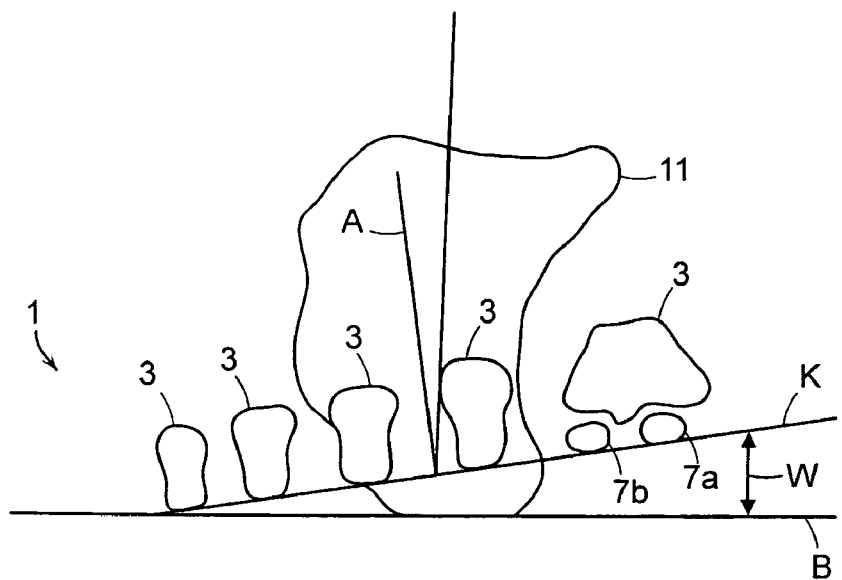
FIG. 2A is a cross-section taken along the metatarsals of the foot of FIG. 1 depicting a pronation condition.

FIG. 2A depicts the foot of a runner experiencing pronation movement, just as the foot first contacts the ground. In particular, the metatarsal bones 3 are aligned along a line ("K") forming on a planar surface an angle ("W") with the ground ("B"). The heel bone 11 and the fifth metatarsal bone 3 (leading to the small toe) contact the ground B. In a pronation movement of the foot, as a runner goes through his gait cycle, he shifts his weight so that the remaining metatarsal bones subsequently come into ground contact, turning his foot from the lateral side to the medial side in the process. Depending on the angle W, a substantial pronation movement may arise leading to the previously discussed danger of injuries, in particular in the knee where the tibia and the fibular seamed bones 7A and 7B form a receiving position.

Figure 2B:
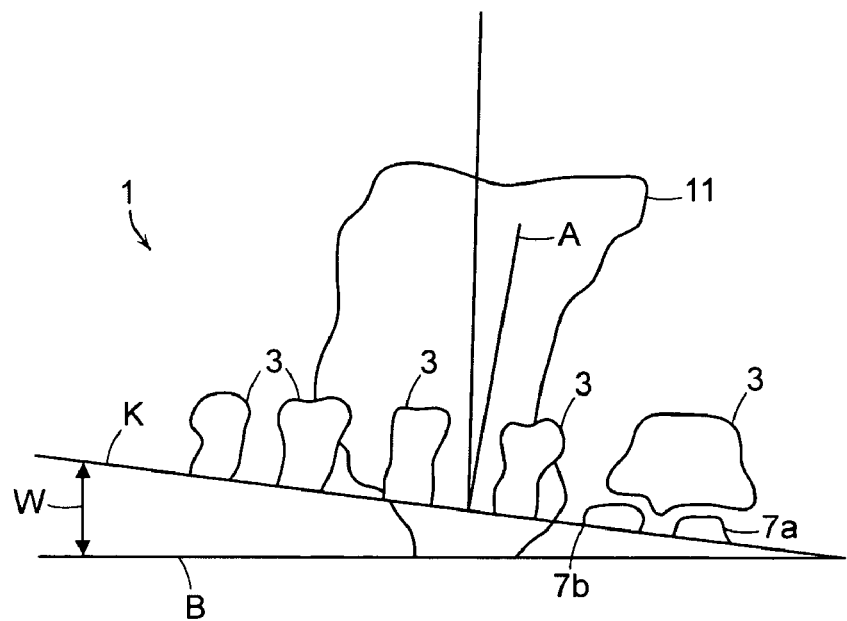
FIG. 2B is a cross-section taken along the metatarsals of the foot of FIG. 1 depicting a supination condition.

FIG. 2B depicts at the beginning of ground contact a foot experiencing an undesirable supination movement. As shown in this situation, the first metatarsal 3 (leading to the big toe) contacts the ground first, following which the runner shifts his weight causing the remaining metatarsals to contact the ground. This leads to a turning movement of the foot from the medial side to the lateral side.

It is an object of the present invention to compensate for the above-described pronation movement and the more rarely arising supination movement by providing the parts of the sole that are below the parts of the foot "being in the air" with an increased density and thereby with a reduced elasticity.

It is known to manufacture soles or parts of soles from expanded polymers, for example, polyurethane (PU) foams. To this end, the polymer material to be expanded is at first expanded into blocks that are subsequently cut into single preforms (so-called blockers). These blockers are inserted into a forming tool and subsequently formed into the desired shape of the sole element with the application of pressure and heat. A sole element produced in such a way can either have a constant thickness over the area of the foot or, if needed, also be formed with a foot-bed. It was, however, a common feature of the preforms known in the prior art to have either a constant thickness (if the sole element to be produced had a constant thickness) or a variation of the thickness corresponding to the variation of the thickness of the sole to be produced. In contrast, the present invention is based, in one example, on a first embodiment of preforms having a thickness modulation in a transverse and/or longitudinal direction corresponding to the density distribution that is later to be obtained.

Figure 3A:
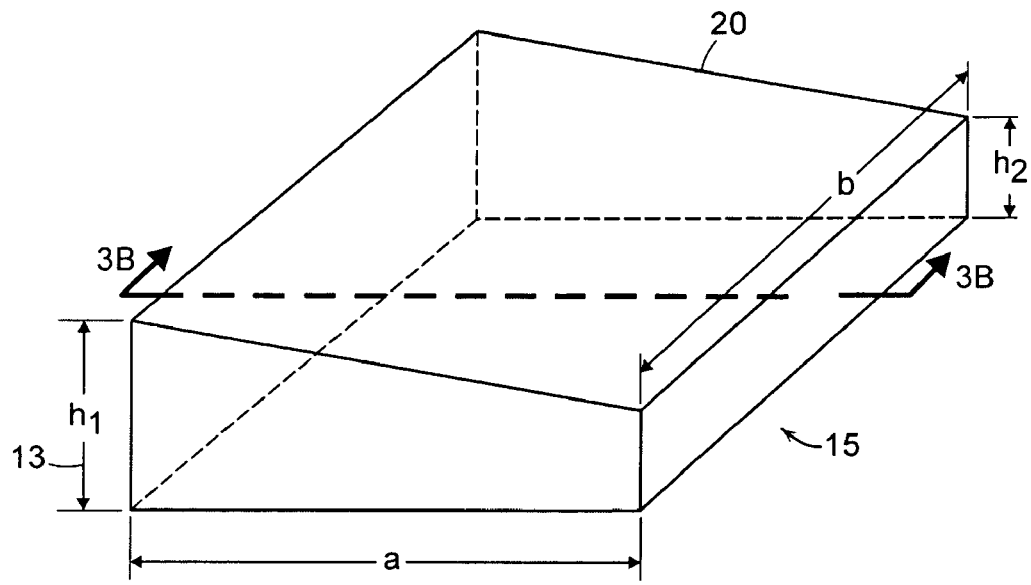
FIG. 3A is a schematic perspective view of a preform in accordance with one embodiment of the invention for the manufacture of a sole element.
Figure 3B:
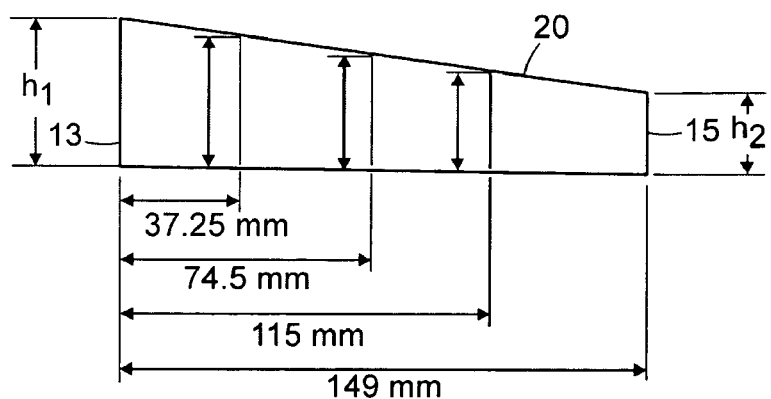
FIG. 3B is a schematic cross-sectional view of the preform of FIG. 3A taken along line 3B-3B.

One embodiment of a preform 20 in accordance with the invention is shown in FIGS. 3A and 3B. In one embodiment, the preform is made from ethylene vinyl acetate (EVA); however, other foamed materials are also useful, such as polyurethane (PU). In FIG. 3A, a perspective view of the preform 20 is shown having, for example, a width ("a") of about 149 mm, a length ("b") of about 250 mm and a continuously decreasing height ("h") from the left side 13 ($h_1$) to the right side 15 ($h_2$). In FIG. 3B, a vertical section through the preform 20 along the line 3B-3B of FIG. 3A is shown. For the illustration of the principle, several heights h are shown with reference to their distance from the left side 13 of the preform 20, where six arbitrarily selected measurement points are shown. If the resulting sole element is to be used for the control of pronation, the left side 13 of the preform 20 corresponds later to the medial side of the sole element.

The corresponding dimensions can be taken from the following table, where the substantially constant hardness of the preform is about 40 C (Shore C):

TABLE 1

Preform dimensions from the medial border to the lateral border in one embodiment

| DISTANCE FROM THE MEDIAL SIDE [MM] | THICKNESS OF THE PREFORM [MM U. %] |
|---|---|
| 0 | 25.0 (192%) |
| 37.25 | 22.5 (173%) |
| 74.50 | 20.0 (154%) |
| 115.00 | 17.5 (135%) |
| 149.00 | 15.0 (115%) |

It can be derived from the table that the preform 20 has at its left side 13 a height (or thickness) of about 25 mm. This corresponds to about 192% of the thickness of the end-formed sole element 25 (see below). At the outermost right side 15 the preform 20 has a thickness of about 15 mm, which corresponds to about 115% of the final thickness of the sole element. Generally, in one embodiment, the change in height or thickness ($\Delta h = h_{original} - h_{final}$) of the preform 20 after forming represents a non-uniform compression of the preform 20. For example, there is greater compression on the left side 13 vs. the right side 15. Further, the ratio of final height to original height ($h_{final}/h_{original}$) will be non-constant and can vary. In the example referenced in Table 1, this ratio ranges from about 50% to about 90%. Values outside this range are also within the scope of the invention.

Figure 4A:
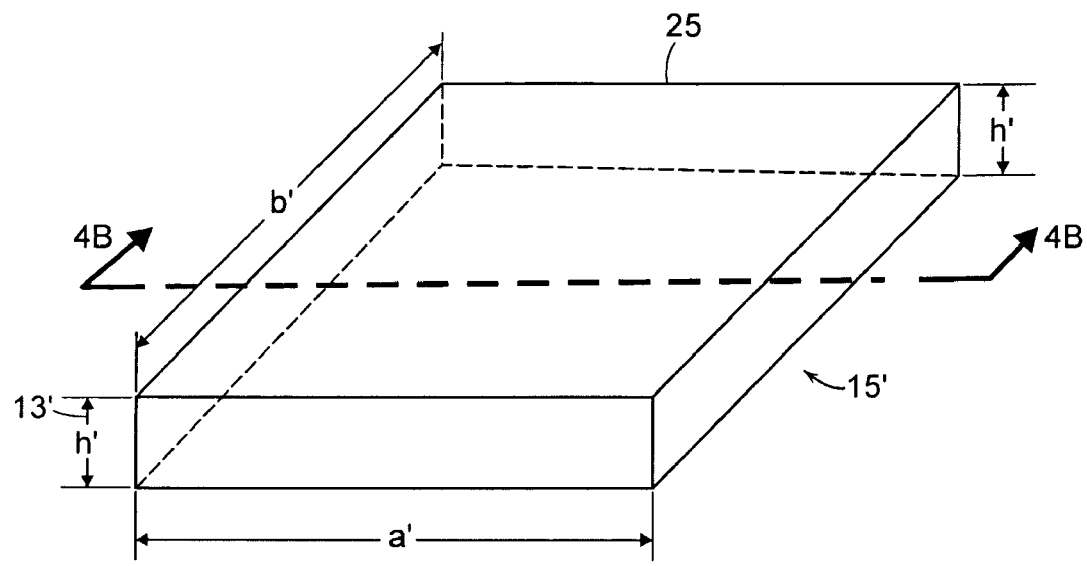
FIG. 4A is a schematic perspective view of a sole element in accordance with one embodiment of the invention, where the sole element has a locally varying density distribution.
Figure 4B:
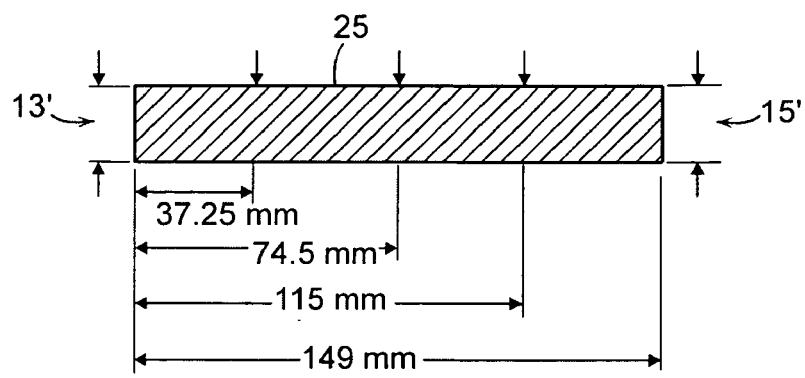
FIG. 4B is a schematic cross-sectional view of the sole element of FIG. 4A taken along line 4B-4B.

If such a preform 20 is formed in a conventionally known forming tool, the sole element 25, as shown in FIGS. 4A and 4B, is obtained.

As depicted in FIG. 4A, the sole element 25 has a width a' of about 149 mm, a length b' of about 250 mm and a constant height h' of about 13 mm. FIG. 4B shows again a vertical section through the finished sole element 25 in accordance with the invention.

If the hardness of the resulting sole element 25 is measured with reference to the distance from the left side 13', the following values shown in Table 2 are obtained:

TABLE 2

Hardness distribution of the shaped sole unit from the medial side 13' to the lateral side 15' in one embodiment

| DISTANCE FROM THE MEDIAL SIDE [MM] | HARDNESS [C] |
|---|---|
| 0 | 60.0 |
| 37.25 | 57.5 |
| 74.50 | 55.0 |
| 115.0 | 52.5 |
| 149.0 | 50.0 |

As can be seen, the hardness (measured in Shore C) decreases from about 60 C to about 50 C. Therefore, a reduction of about 10 C is obtained (i.e., in the range of about 15% to 20%), if the preform 20 is as described in Table 1 and consists of polyurethane. Values outside this range are also within the scope of the invention. It should be noted that the dimensions given herein are exemplary only, and that the specific size, shape, and hardness of the preforms 20 and/or the resultant sole elements 25 will vary to suit the particular application. For purposes of explanation, the preforms 20 shown in FIGS. 3A and 3B have generally polygonal cross-sectional profiles; however, the shapes of the preforms can have various contours and can vary in cross-sectional profiles, as necessary to correspond to a desired final sole shape. For example, the preform shapes can be polygonal, arcuate, convex, concave, and/or combinations thereof. In one example, the final sole element corresponds to a midsole having multiple contours corresponding to, for example, a bottom of a foot.

The locally varying hardness of the sole unit 25 can be explained by the surplus of material on the left side 13, which is compressed more than the material on the right side 15 during the final forming step in such a way that a continuously varying density distribution is obtained in the sole unit 25. The resulting density, in turn, influences the hardness and therefore the elasticity of the sole unit 25.

Figure 5A:
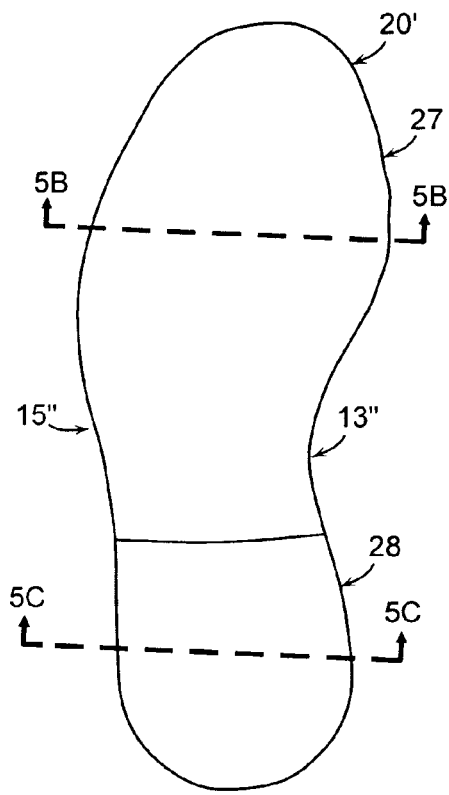
FIG. 5A is a schematic plan view of a sole element in accordance with one embodiment of the invention, where the sole element has a varying density distribution from a lateral side to a medial side and from a rearfoot part to a forefoot part.
Figure 5B:
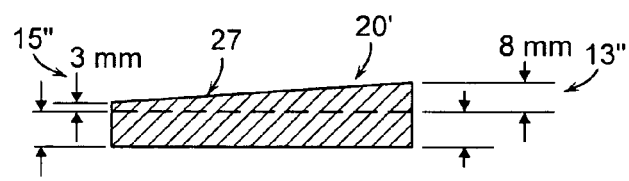
FIG. 5B is a schematic cross-sectional view of the sole element of FIG. 5A taken along line 5B-5B.
Figure 5C:
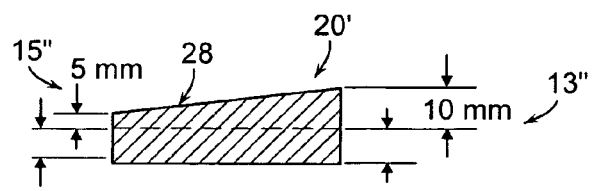
FIG. 5C is a schematic cross-sectional view of the sole element of FIG. 5A taken along line 5C-5C.

FIGS. 5A-5C show an alternative embodiment of a preform 20' in accordance with the invention. This preform 20' having already the shape of a sole has the special feature that the height does not only vary from the medial (formerly left) side 13" to the lateral (formerly right) side 15", but also from the rear foot part 28 to the forefoot part 27. The sections along the line 5B-5B (FIG. 5B) and the line 5C-5C (FIG. 5C) show that the surplus of height in the forefoot part 27 is about 8 mm on the medial side 13" and about 3 mm on the lateral side 15"; whereas, in the rear foot part 28, the surplus is about 10 mm on the medial side 13" and about 5 mm on the lateral side 15". With such a preform 20', a modulation of the density and, therefore, of the hardness is not only obtained from the medial side 13" to the lateral side 15", but also from the rear foot part 28 to the forefoot part 27.

In the following, several alternative embodiments of preforms 20-1 to 20-4 are described with reference to the FIGS. 6 to 9.

Figure 6:
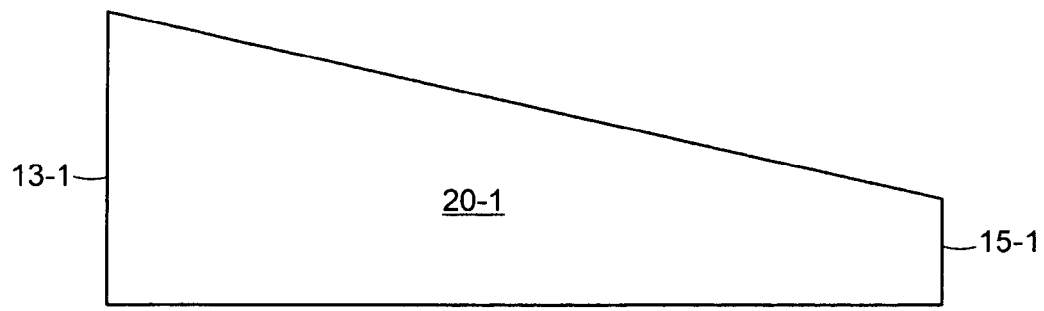
FIG. 6 is a schematic side view of a preform in accordance with one embodiment of the invention having a first profile.
Figure 7:
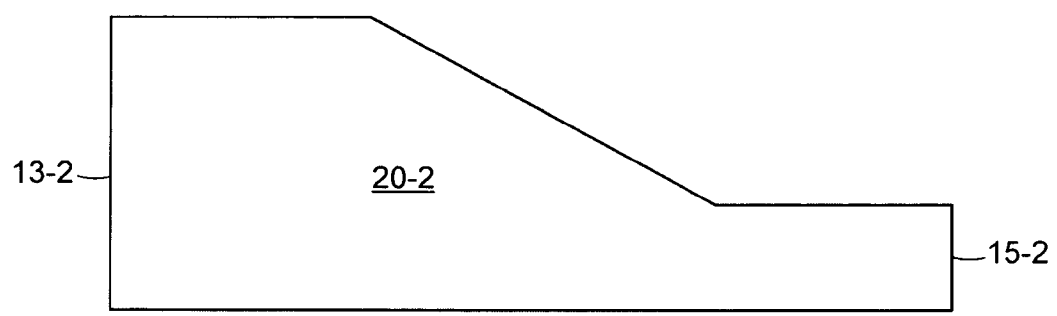
FIG. 7 is a schematic side view of a preform in accordance with one embodiment of the invention having a second profile.

The preform 20-1 shown in FIG. 6 corresponds to the preform 20 discussed and shown in FIG. 3A. Such preforms 20-1 have the advantage that they can be easily cut from a larger block of preformed polymer material for a subsequent end-forming. The preform 20-2 shown in FIG. 7 compensates an effect that counteracts the density distribution in accordance with the invention from the left side 13-2 to the right side 15-2. Since the preform 20-2 is not only pressed in the forming tool, but also heated, it changes shape and has a natural tendency to flow to the right side 15-2, thereby counteracting the desired density profile. For this reason, not only on the left side 13-2, but also on the right side 15-2, a local plateau area is provided, which serves as a "buffer" to counteract the flow of material.

Figure 8:
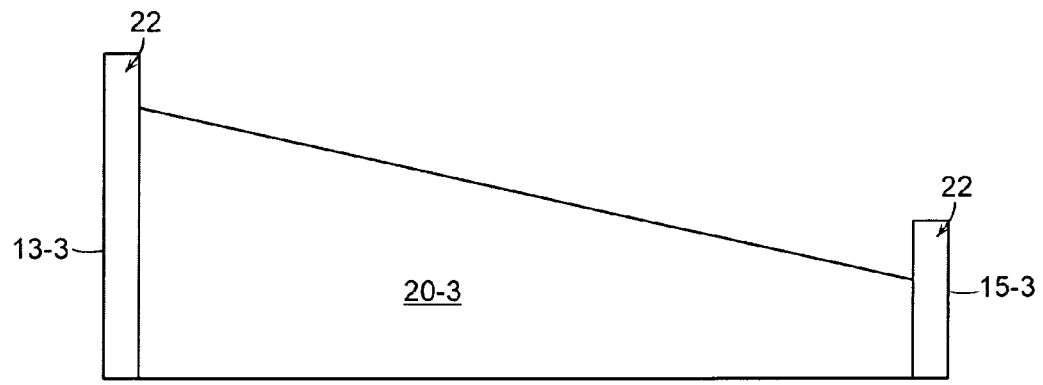
FIG. 8 is a schematic side view of a preform in accordance with one embodiment of the invention having a third profile.

The embodiment shown in FIG. 8 is a preform 20-3 of a sole element that is, in particular, used for shoes where the sole element is to provide additionally a sideways or transverse support of the foot. The forming tools used for the manufacture of such sole elements have, therefore, corresponding recesses into which the preform material is pressed during the press-forming. This is relatively difficult if, for example, a preform as shown in FIG. 6 is used having a material with a high viscosity. Therefore, a rim 22 is provided in accordance with the invention at the edge of the preform 20-4 for fitting into a corresponding recess of the tool and leading later to a corresponding rim of the sole element. The same applies for the embodiment of a preform 20-4 shown in FIG. 9 that corresponds to the preform 20-2 of FIG. 7, with a rim 22 for a sideways or transverse support of the foot.

Figure 9:
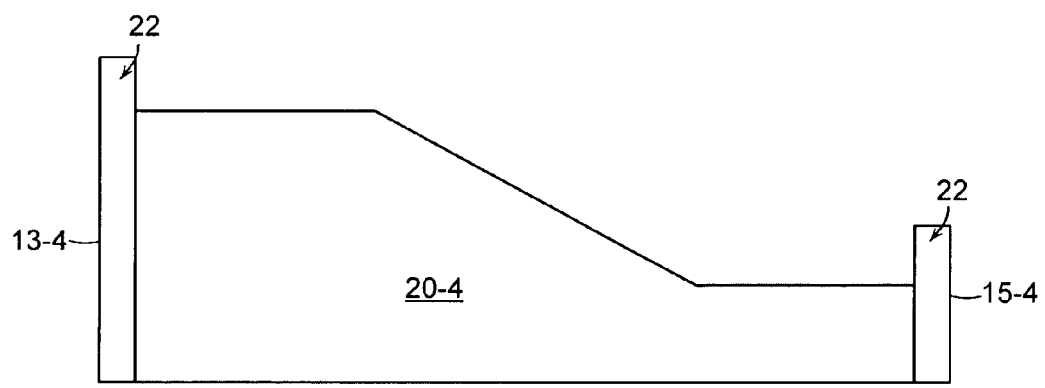
FIG. 9 is a schematic side view of a preform in accordance with one embodiment of the invention having a fourth profile.
Figure 11A:
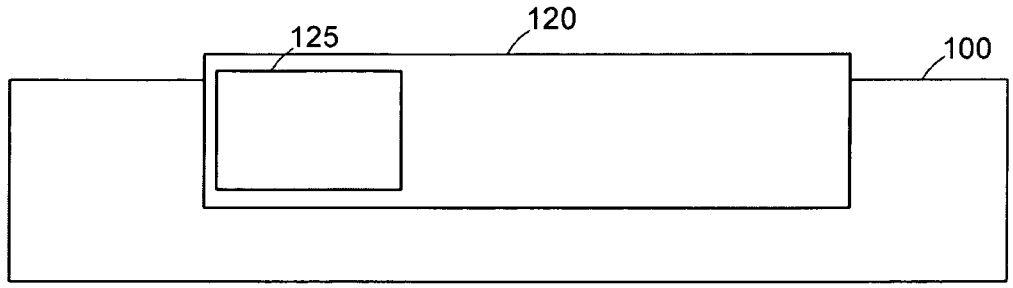
FIGS. 11A-11C are schematic representations of a prior art forming tool.
Figure 11B:
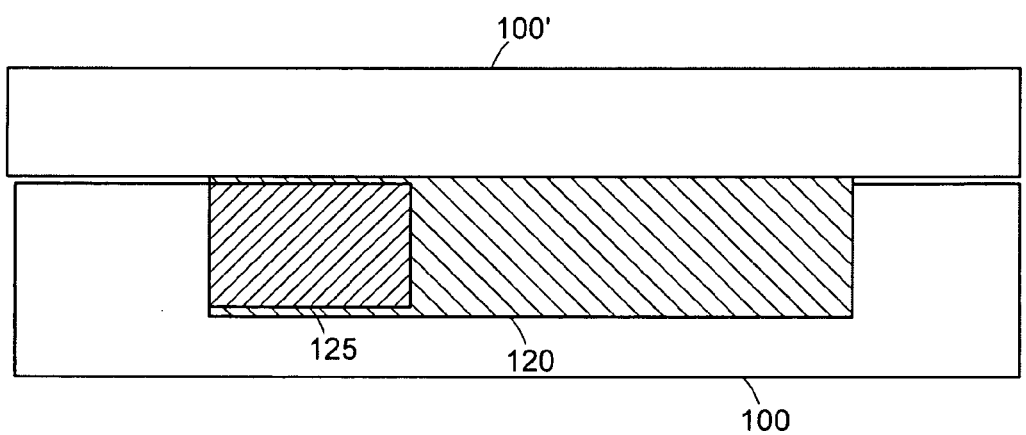
Figure 11C:
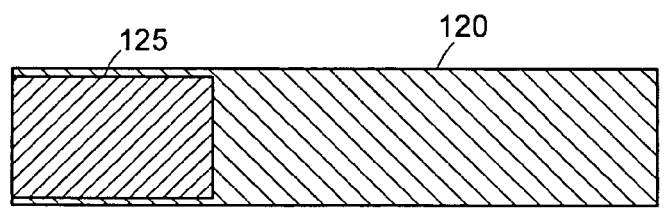
Figure 12:
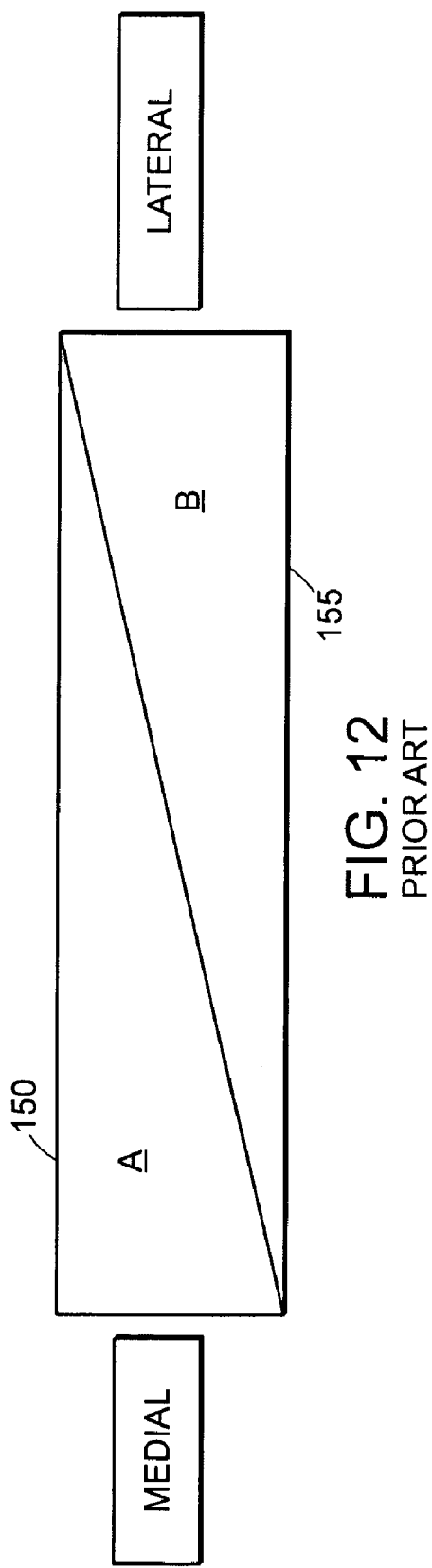
FIG. 12 is a schematic transverse cross-sectional view of a sole element in accordance with the prior art.

In particular, in the context of the preforms 20-3, 20-4 shown in FIGS. 8 and 9, it becomes clear that preforms with complex shapes cut from a pre-expanded block can entail a relatively high degree of waste. For this reason, it is possible, in accordance with an embodiment of the invention, to manufacture the preform in a single step in the desired shape, as opposed to cutting or modulating the preform 20 from a pre-expanded block. This can, for example, be achieved by producing the preform by injection molding, so that a subsequent treatment for the manufacture of the desired thickness distribution is no longer necessary. Such a preform has only to be transformed into a sole element to create the desired density modulation from the thickness modulation.

An additional method in accordance with the invention for the manufacture of sole elements with a desired density distribution is described with reference to FIG. 10. FIG. 10 shows schematically one half of a forming tool 40 for the manufacture of sole elements in accordance with the invention. For the sake of clarity, the upper half of the tool is not shown. It is common in the state of the art of forming tools to subject the corresponding preforms in the forming area not only to pressure, but also to heat the preforms as part of the forming process. The prior art, however, uses only tools with powerful heating elements that heat the complete tool to a desired temperature. In a particular embodiment of a method in accordance with the invention, a tool is used that includes an array of, for example, heating elements 50 for heating certain portions of the forming surface to a well-defined temperature profile. Since the preform in the tool expands differently depending on the heat supplied, it is possible to differently expand different parts of the preform by a defined control of the heating elements 50. As a result, different densities and, therefore, different hardnesses are obtained in different parts of the resulting sole element. The result of this method is, therefore, a sole element having a locally changing and specifically adapted density distribution.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A method of manufacturing a finished sole element for a shoe, the finished sole element having a varying density distribution in at least one direction, the method comprising:
   manufacturing a sole element preform from a polymer material; and
   press-forming the sole element preform in a forming tool with a selective supply of heat to single sections of a surface of the tool to locally selectively expand areas of the sole element preform to form the finished sole element, wherein a resulting varying density distribution in the finished sole element substantially corresponds to the areas of selective expansion of the sole element preform.

2. The method of claim 1, wherein the resulting varying density increases from a lateral side of the sole element to a medial side of the sole element.

3. The method of claim 1, wherein the resulting varying density decreases from a lateral side of the sole element to a medial side of the sole element.

4. The method of claim 1, wherein the resulting varying density varies from a rear foot part of the sole element to a forefoot part of the sole element.

5. The method of claim 1, wherein the step of manufacturing the sole element preform comprises the step of manufacturing the preform with a thickness decreasing from a medial side of the preform to a lateral side of the preform.

6. The method of claim 5, wherein the thickness decreases linearly.

7. The method of claim 1, wherein the step of manufacturing the sole element preform comprises the step of manufacturing the preform with a first portion having a substantially constant thickness from a medial side of the preform, an intermediate portion with a linear decrease in thickness, and a second portion having a substantially constant thickness in a direction of a lateral side of the preform.

8. The method of claim 1, wherein the step of manufacturing the sole element preform comprises the step of providing a preform including a rim of substantially constant thickness.

9. The method of claim 1, wherein the step of manufacturing the sole element preform comprises the step of expanding a block of a polymer material and subsequently cutting the block to obtain a desired thickness distribution.

10. The method of claim 9, wherein the polymer material comprises ethylene vinyl acetate.

11. The method of claim 1, wherein the step of manufacturing the sole element preform comprises injection molding the preform.

12. A method of manufacturing a finished sole element for a shoe, the finished sole element having a varying density distribution in at least one direction, the method comprising:
   manufacturing a sole element preform from a polymer material with a thickness varying in the at least one direction corresponding to a desired density distribution in the finished sole element, wherein the sole element preform is manufactured with a first portion having a substantially constant thickness from a medial side of the preform, an intermediate portion with a linear decrease in thickness, and a second portion having a substantially constant thickness in a direction of a lateral side of the preform; and
   press-forming the sole element preform in a forming tool to form the finished sole element from the sole element preform.

13. A method of manufacturing a finished sole element for a shoe, the finished sole element having a varying density distribution in at least one direction, the method comprising:
   manufacturing a sole element preform from a polymer material, wherein the sole element preform is manufactured with a first portion having a substantially constant thickness from a medial side of the preform, an intermediate portion with a linear decrease in thickness, and a second portion having a substantially constant thickness in a direction of a lateral side of the preform; and
   press-forming the sole element preform in a forming tool with a selective supply of heat to single sections of a surface of the tool to locally selectively expand the sole element preform to form the finished sole element with the varying density distribution from the sole element preform.

14. A method of manufacturing a finished sole element for a shoe, the finished sole element having a varying density distribution in at least one direction, the method comprising:
   manufacturing a sole element preform from a polymer material with a thickness varying continuously along at least a portion of the preform in the at least one direction, the varying thickness corresponding to a desired density distribution in the finished sole element; and
   press-forming the sole element preform in a forming tool to form the finished sole element from the sole element preform, wherein a resulting varying density distribution in the finished sole element substantially corresponds to the varying thickness of the preform prior to press-forming, wherein the step of manufacturing the sole element preform comprises the step of manufacturing the preform with a first portion having a substantially constant thickness from a medial side of the preform, an intermediate portion with a linear decrease in thickness, and a second portion having a substantially constant thickness in a direction of a lateral side of the preform.

15. The method of claim 14 further comprising the step of supplying heat during the press-forming step.

16. The method of claim 14, wherein the finished sole element comprises a substantially constant thickness in at least one direction.

17. The method of claim 14, wherein the sole element preform is subjected to a non-uniform compression during the press-forming step.

18. The method of claim 14, wherein the resulting varying density varies continuously across at least a portion of the finished sole element.

19. The method of claim 14, wherein the resulting varying density increases from a lateral side of the sole element to a medial side of the sole element.

20. The method of claim 14, wherein the resulting varying density decreases from a lateral side of the sole element to a medial side of the sole element.

21. The method of claim 14, wherein the resulting varying density varies from a rear foot part of the sole element to a forefoot part of the sole element.

22. The method of claim 14, wherein the step of manufacturing the sole element preform comprises the step of manufacturing the preform with a thickness decreasing from a medial side of the preform to a lateral side of the preform.

23. The method of claim 22, wherein the thickness decreases linearly.

24. The method of claim 14, wherein the step of manufacturing the sole element preform comprises the step of providing a preform including a rim of substantially constant thickness.

25. The method of claim 14, wherein the step of manufacturing the sole element preform comprises the step of expanding a block of a polymer material and subsequently cutting the block to obtain a desired thickness distribution.

26. The method of claim 25, wherein the polymer material comprises ethylene vinyl acetate.

27. The method of claim 14, wherein the step of manufacturing the sole element preform comprises injection molding the preform.

* * * * *